United States Patent [19]
Holz

[11] 3,877,603
[45] Apr. 15, 1975

[54] TRAY FOR SERVING MEALS

[75] Inventor: Heinz Holz, Velbert/Hannover, Germany

[73] Assignee: FKF Berlin - Fleischwaren- und Konservenfabrik Schulz & Berndt GmbH & Co. KG, Berlin, Germany

[22] Filed: July 13, 1972

[21] Appl. No.: 271,588

[30] Foreign Application Priority Data
July 13, 1971 Germany............................2135660
June 12, 1972 Germany............................2229251

[52] U.S. Cl.................................. 220/23.83; D7/38
[51] Int. Cl............................................. A47g 19/00
[58] Field of Search............... 220/23.4, 23.2, 23.83; D7/38; D9/183, 187

[56] References Cited
UNITED STATES PATENTS

| | | | |
|---|---|---|---|
| 2,614,399 | 10/1952 | Roethel | 220/23.4 |
| 3,356,250 | 12/1967 | Russel | 220/54 |
| 3,501,044 | 3/1970 | Stone | 220/23.4 |
| D208,565 | 9/1967 | Leonardo | D7/38 |
| D214,362 | 6/1969 | Gorman | D9/187 |
| D214,459 | 6/1969 | Stageberg | D7/38 |

*Primary Examiner*—William I. Price
*Assistant Examiner*—Steven M. Pollard
*Attorney, Agent, or Firm*—Reginald F. Pippin, Jr.

[57] ABSTRACT

A tray for serving meals, for example on an aircraft, having a rigid base of metal or plastics material, the upper surface being provided with one or more recesses for cold food, cutlery and the like. A number of hot food containers, such as food cans provided with tear strips, are individually peripherally gripped and supported as a unit in a clip or tray like insert, which can be placed in an oven for heating, prior to being placed in a further recess in the upper surface of the tray.

11 Claims, 3 Drawing Figures

TRAY FOR SERVING MEALS

DISCLOSURE

The present invention relates to a tray for serving cold and hot meals, for example in an aircraft.

In a serving tray of the indicated type, for serving for example lunch or dinner on long-distance flights, it is necessary to offer the passenger a combination of foods, with a part of the food such as meat and fish constituents and also vegetables and the like, being presented hot. It is desirable to ensure that the foods intended to be consumed hot also actually reach the passenger hot and in an attractive form as regards the containers in which the foods are presented.

It is known, in order to fulfil these requirements, for example in aircraft, where particularly critical parameters have to be observed in connection with the preparation and serving of meals, to take the meals, which are to be offered warm, on board in the form of deep-frozen food and then to heat this in the hot-air ovens on the aircraft. After warming up or cooking the particular foods, the service personnel then have to transfer it into appropriate serving dishes or plates. The expenditure of labour necessarily occasioned by this work and by serving passengers, the numbers of which frequently run into hundreds, by a limited number of stewardesses which during the serving time frequently have to perform additional and unforeseen work, results in the food frequently reaching the passenger in a condition which considerably impairs its enjoyment because it has cooled. If, additionally, containers which are to be re-used are employed for serving such food, the problem of cleaning arises, whilst if disposable containers are used, the latter are in most cases not very attractive or are made very thin-walled so that this causes rapid cooling.

According to the present invention there is provided a tray for serving meals, such tray comprising a rigid base having at least one recess in the upper surface for cold foods, cutlery and the like, removable heat resistant holding means to hold a plurality of hot food containers as a unit, and at least one further recess in said upper surface to accommodate said holding means and said hot food containers.

Such a tray makes it possible to offer menus consisting of cold and warm foods with minimum possible effort by personnel and expenditure of time, and to do so in an aesthetically particularly attractive form.

In one embodiment of the invention said holding means comprises an insert in the form of a closed bottomed inner tray with a plurality of recesses in its upper surface to hold said hot food containers. The invention further provides such a tray having hot food containers in the recesses of said insert, the upper surfaces of said food containers being substantially flush with the upper surface of the insert. The hot food containers may be removably received in said recesses of the insert or securely and irremovably held in the recesses of the insert.

According to a second embodiment of the invention the holding means comprises a structure enabling the food containers to be held together mechanically adequately for one manipulation. This structure may be formed as a pressing from sheet material and includes food containers push fitted into the structure thus providing individually peripherally gripped and retained multiple hot food containers as a cohesive unit within a single removable heat-resistant sub-unit, which altogether form a heatable cohesive unit assembly. With such a construction it is possible to compose any desired menu in a particularly simple and economical manner, that is to say with minimum possible expenditure with regard to storage and effort in the context of service personnel, and that furthermore, the effort in connection with warming-up is extremely little since the warm constituent of the meal, in the hot food containers, can with a few handling steps be introduced into the warming-up oven, taken therefrom and then inserted, ready to serve, into the serving tray in one manipulation, the requisite short manipulation time also ensuring that the warm constituents of the menu are indeed presented for consumption in a warm state and not merely in a lukewarm state. Experience has shown that with prior arrangements the food does arrive lukewarm, especially if, as is customary the constituents of the meal, after being warmed up, are placed portion by portion on cold plates. Where prewarmed plates have been used according to the state of the art, this requires additional effort which is considerable, especially in aircraft. The insert and holding means may be made of metal, and the containers themselves may be food cans provided with tear strips.

The advantages achieved through the invention in particular consist of the fact that compared to expensive stocking of deep-frozen food it is possible to use the meals, which are to be served warm, in such food cans, with low storage costs, that it is possible to offer, without special effort, practically any desired combinations of, for example, three warm components of a meal, that is to say, for example, not to offer flight passengers a fixed previously prepared menu but to allow the guest to make a certain selection, and that this menu can be prepared with a few manipulations and can be served warm and in an attractive manner.

In order that the invention will be better understood, the following description is given, merely by way of example, reference being made to the accompanying drawings, in which.

Figure 1:
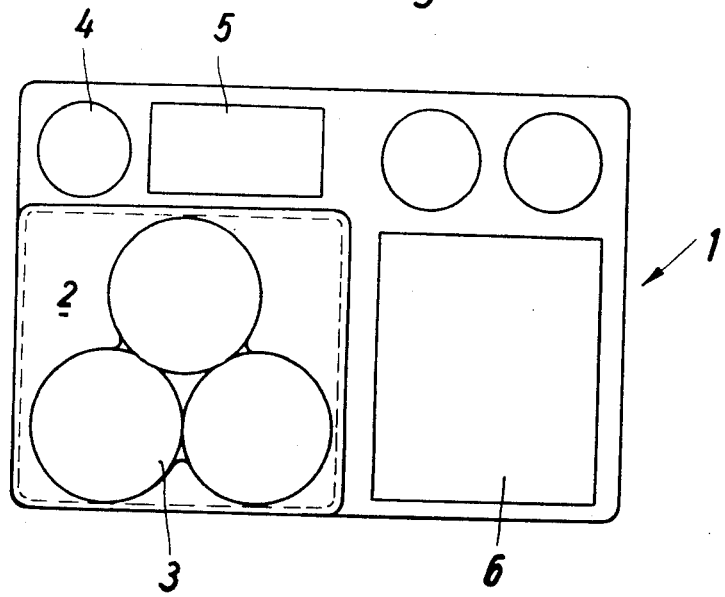
FIG. 1 is a plan view of one embodiment of serving tray according to the invention.
Figure 2:
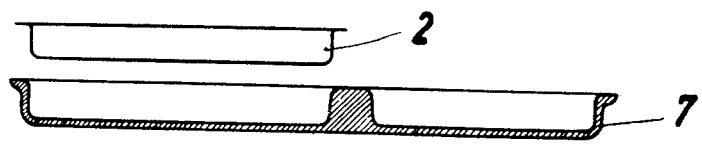
FIG. 2 is a section through the serving tray of FIG. 1.
Figure 3:
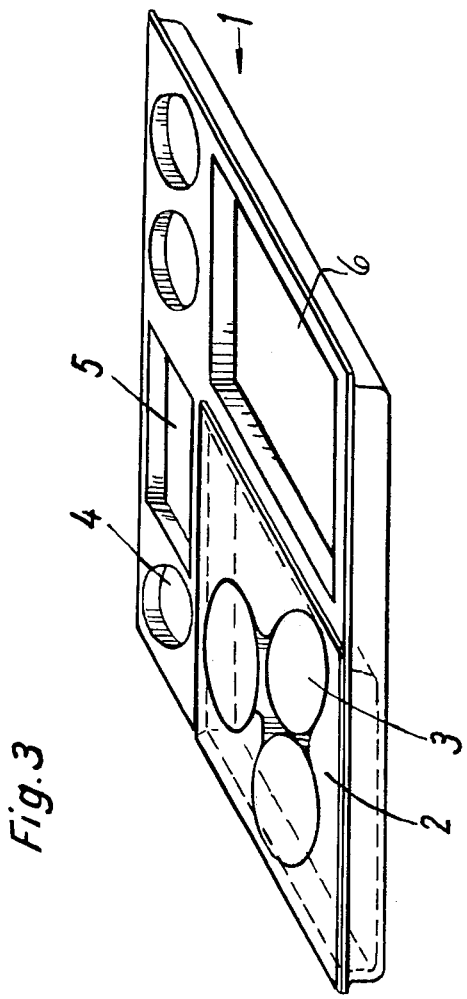
FIG. 3 is a perspective view of this serving tray.

A serving tray 1 illustrated in the drawings is formed by an insert sub-unit 2 and a base 7. The base 7 is manufactured in the usual manner from a plastics material and has the wall thickness or moulded-in strengthening ribs sufficient to withstand the stresses to be expected. Formed in the upper surface of the base 7 are moulded-in recesses. Recess 5 may receive a serviette and a set of cutlery, while the recesses 4 may receive cold side-dishes, such as a first course and dessert, a cup and juice container which cannot slide, whilst the recess 6 can for example be provided to receive appropriately packaged butter, condiments and the like.

An insert assembly is formed by a plurality - three as shown - of containers 3 in the form of food cans and the actual insert tray sub-unit 2 into which the containers 3 are inserted. The containers 3 can be firmly connected in individually peripherally gripped relation within the insert sub-unit 2, as by push-fitting therein, to form one insertable unit sub-assembly, so that the containers, for example food cans which may be provided with tear strips, can be warmed together with the insert tray sub-unit 2 in a hot air oven or the like. In this case, the insert tray sub-unit 2 is preferably appropriately manufactured from sheet metal. On the other hand, the insert tray sub-unit 2 can also be manufactured from a plastics material which may be the same as that of the base 7, and in this case the containers 3 are warmed separately therefrom and are then fitted into the insert tray sub-unit 2 before serving.

Preferably, the upper surfaces of the containers 3 are practically flush with the upper surface of the insert tray sub-unit 2, which results in an attractive appearance and the passenger who, where appropriate, can himself easily open these containers because of the presence of tear-strips and the like, does not receive the impression that he is being offered warmed-up food in "food cans."

In a second embodiment according to the invention, the unit sub-assembly formed of the insert tray sub-unit 2 and the food cans 3 is replaced by a structure such that the insert 2 forms a part of the moulded service tray 1 and that the food cans can be inserted into a recess of appropriate size, with the food cans being connected together as a unit as by a heat-resistant clip-like device holding sub-unit (not shown) to form an insert sub-assembly unit arrangement similar to a three or four leaved clover plant. This structure secures the food cans in such a way that the latter are held together mechanically and can be handled as a unit, and consists of a material which can withstand the temperatures in hot air heating ovens, such as are used in aircraft. Where warming-up in water baths or the like is provided, the material is correspondingly made water-resistant. Available suitable materials are heat-resistant and optionally impregnated cardboards, plastics, such as, for example, polytetrafluoroethylene, or a metal, such as a light metal alloy, and under the concept of a structure, used here, there are also to be understood clip-like devices, which ensure an appropriate mechanical cohesion.

The subject of the invention is not restricted to the rectangular shape shown here; rather, other configurations, say oval or in the form of an artist's palette may be used and the same is true with regard to the different sizes which can be chosen, depending on the envisaged service organization, such as air travel, railways, general restaurant trade or factory canteens. The number of the food cans and of the further foodstuffs to be presented can be chosen as desired and this is also true with regard to the shape of the food can, which can be from round to angular. The use of food cans with tear-strips has proved particularly appropriate.

I claim:
1. A tray for serving meals, said tray comprising, in combination:
   a rigid base having an upper surface;
   means defining at least one recess in the upper surface for cold foods, cutlery and the like;
   a removable heat resistant holding sub-unit configured to peripherally retentively grip and hold a plurality of hot food containers as a unit; and
   further recess defining means in said upper surface to removably accommodate said removable holding sub-unit with a plurality of such hot food containers in said sub-unit.
2. A tray according to claim 1, wherein said holding sub-unit comprises an insert in the form of a closed bottomed inner sub-tray having an upper surface with a plurality of recesses to hold said hot food containers.
3. A tray according to claim 2, and further comprising hot food containers in the recesses of said insert, the upper surfaces of said food containers being substantially flush with the upper surface of the insert.
4. A tray according to claim 3, wherein said hot food containers are removably received in said recesses of the insert.
5. A tray according to claim 3, wherein said hot food containers are securely and irremovably held in the recesses in said insert.
6. A tray according to claim 1, and a plurality of individually discrete hot food containers disposed in individually peripherally gripped and retained relation as a cohesive unit assembly within and by said sub-unit.
7. A tray according to claim 3, wherein said food containers are food cans provided with tear strips.
8. A tray according to claim 1, wherein said holding means comprises a sub-tray enabling said food containers to be held together mechanically as a unit for unitary manipulation.
9. A tray according to claim 1, said sub-unit having plural-container receiving and peripherally retentively gripping walls formed therein for peripherally retentively gripping and holding said hot food containers.
10. A tray according to claim 9,
    wherein said sub-tray is formed as a sheet material pressing,
    and further comprising hot food containers push-fitted into said sub-tray.
11. A tray according to claim 1,
    said holding sub-unit comprising a clip device for effecting mechanical holding of food containers in said further recess.

* * * * *